(12) United States Patent
Kinzenbaw

(10) Patent No.: US 7,900,711 B2
(45) Date of Patent: Mar. 8, 2011

(54) AGRICULTURAL PLANTER

(75) Inventor: Jon E. Kinzenbaw, Williamsburg, IA (US)

(73) Assignee: Kinze Manufacturing, Inc., Williamsburg, IA (US)

(*) Notice: Subject to any disclaimer, the term of this patent is extended or adjusted under 35 U.S.C. 154(b) by 0 days.

(21) Appl. No.: 12/499,575

(22) Filed: Jul. 8, 2009

(65) Prior Publication Data
US 2010/0006016 A1    Jan. 14, 2010

Related U.S. Application Data

(60) Provisional application No. 61/078,909, filed on Jul. 8, 2008.

(51) Int. Cl.
*A01B 63/00* (2006.01)
*A01B 63/16* (2006.01)

(52) U.S. Cl. .......... 172/395; 172/407; 172/423; 172/453

(58) Field of Classification Search ............. 111/22, 111/52, 57, 200; 172/311, 457, 458, 466, 172/482, 395, 407, 423, 452
See application file for complete search history.

(56) References Cited

U.S. PATENT DOCUMENTS

| | | | | |
|---|---|---|---|---|
| 4,721,168 A * | 1/1988 | Kinzenbaw | .................. | 172/311 |
| 5,579,849 A * | 12/1996 | Houck | .......................... | 172/456 |
| 5,921,325 A * | 7/1999 | Meek et al. | .................... | 172/311 |
| 6,238,170 B1 * | 5/2001 | Pingry et al. | .................. | 414/550 |
| 6,588,351 B1 * | 7/2003 | Hall et al. | ......................... | 111/59 |

* cited by examiner

*Primary Examiner* — Christopher J. Novosad
(74) *Attorney, Agent, or Firm* — Wildman, Harrold, Allen & Dixon LLP

(57) ABSTRACT

An agricultural implement pulled by a traction vehicle is convertible between use and transport configurations. The implement includes a carrier frame coupled to the vehicle via the combination of a hitch and a draft tongue having an aft portion pivotally coupled to the carrier frame and including a generally vertical cornered post rotatable about a vertical pivot axis. A lift frame having plural spaced row units includes an integral center frame section with a sleeve closely engaging and vertically slideable along the cornered post. A first displacement arrangement moves the aft portion of the draft tongue between the use position and a first elevated position for avoiding obstructions and to facilitate turning in a field, while second and third displacement arrangements respectively raise the lift frame higher on the vertical post and rotate the post and lift frame about the vertical axis to a longitudinal position for transport.

20 Claims, 14 Drawing Sheets

AGRICULTURAL PLANTER

FIELD OF THE INVENTION

This invention relates to a method and apparatus for an agricultural planter which may be transported in an endwise or longitudinal orientation, while maintaining a direct mechanical connection between the implement hitch and the planter toolbar when it is placed in a transverse position for field use.

BACKGROUND

Systems have been used to allow an implement to be converted quickly and conveniently between a field use position and a transport position for road travel without requiring the operator to install or remove pins or bolts or the like. Some planters have used a combination of an upright central post about which the toolbar and row units are rotated to convert between transport and field use. In this planter, a roller and track set that is engaged through a predetermined vertical distance when raising the toolbar, and then disengages to allow the toolbar to be rotated 90 degrees for rotation to a transport position. One such design is disclosed in U.S. Pat. No. 5,346,019. This design requires that the hitch and main axle of the machine remain at a constant elevation and be of substantial (and thus expensive) construction so that the planter frame and row units can be lifted away from the hitch repeatedly as the planter is raised for turning at the end of the field in preparation for the next planting pass.

This arrangement requires that the support frame for the toolbar and row units be a structure of considerable mass positioned relatively close to the ground. This support structure cannot be raised should it become necessary to cross over a berm or pass through a low lying passage, or encounter other obstructions in the field. Thus, when an obstruction is encountered, the planter hitch and main axle structure are normally dragged across the obstruction. Another drawback of this design is that the guide tracks located on the ends of the axles, which are used to guide and control the toolbar as it is raised for turns at row ends, must be of sufficient height and design that complete engagement is effected through the lift cycle until just prior to the transport height. This results in complications to the overall implement design to incorporate the guide track.

A further characteristic of the prior design is that the same hydraulic cylinders that lift the planter in the repeated field raise/lower sequence are also used to elevate the planter to its road transport elevation.

While this prior design is well-proven and reliable, one potential drawback of the design is that the support wheels at the distal ends of the toolbar are operated by slave cylinders in a master/slave set.

Thus, as the planter is raised to a transport height, the wing wheel cylinders are extended, and left in an extended position, which leaves the wing wheels in a lowered position (relative to the mounting bar of the toolbar). This places the end wheels lower, that is, closer to the ground.

Then, when the toolbar is rotated 90 degrees for transport, the lower end wheels are moved to a position which is transverse to the direction of travel and thus can become damaged by dragging on the ground during transport, if the planter is pulled through a valley or over other abruptly changing terrain.

There are methods using a combination of valves to reverse the flow of hydraulic fluid to the slave cylinders that would cause them to retract as the planter toolbar is raised to the transport position. While this is possible it would complicate the control system and add cost. The instant invention addresses these drawbacks without losing the advantages of a center-rotation/endwise-transport planter design.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE ILLUSTRATED EMBODIMENTS

The present invention includes a hitch for attachment of the planter to the tractor. The hitch is a telescoping design that allows the hitch to be shortened as much as practical in the field use position but be lengthened to the toolbar and row units to be rotated to extend lengthwise in the direction of travel, for transport. The hitch could also be a non-telescoping design which would be practical on smaller sized machines.

Figure 2:
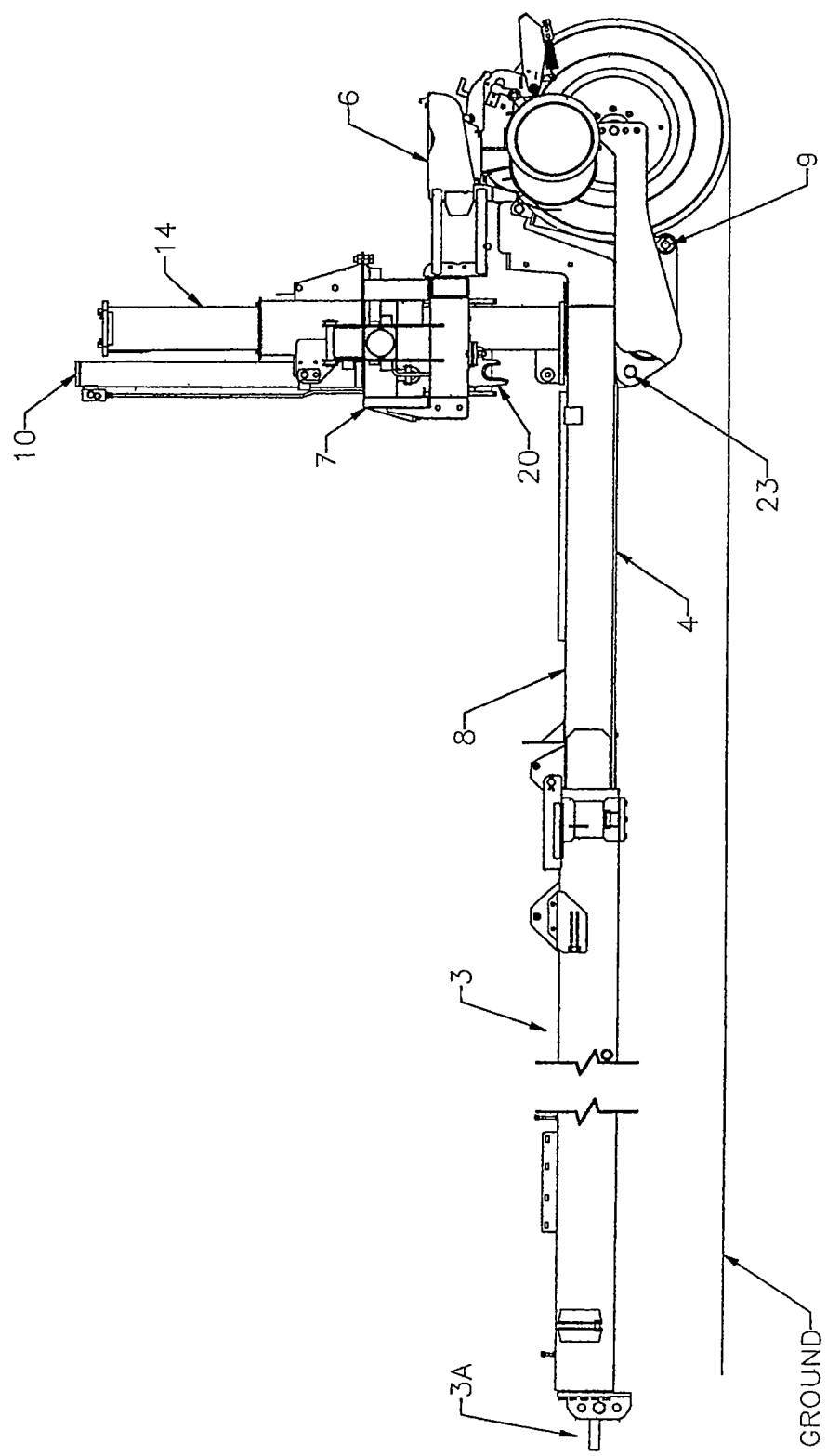
FIG. 2 is a partially cutaway side elevation view of the inventive agricultural implement illustrating a telescoping hitch arrangement attached to a forward portion of the implement.
Figure 2A:
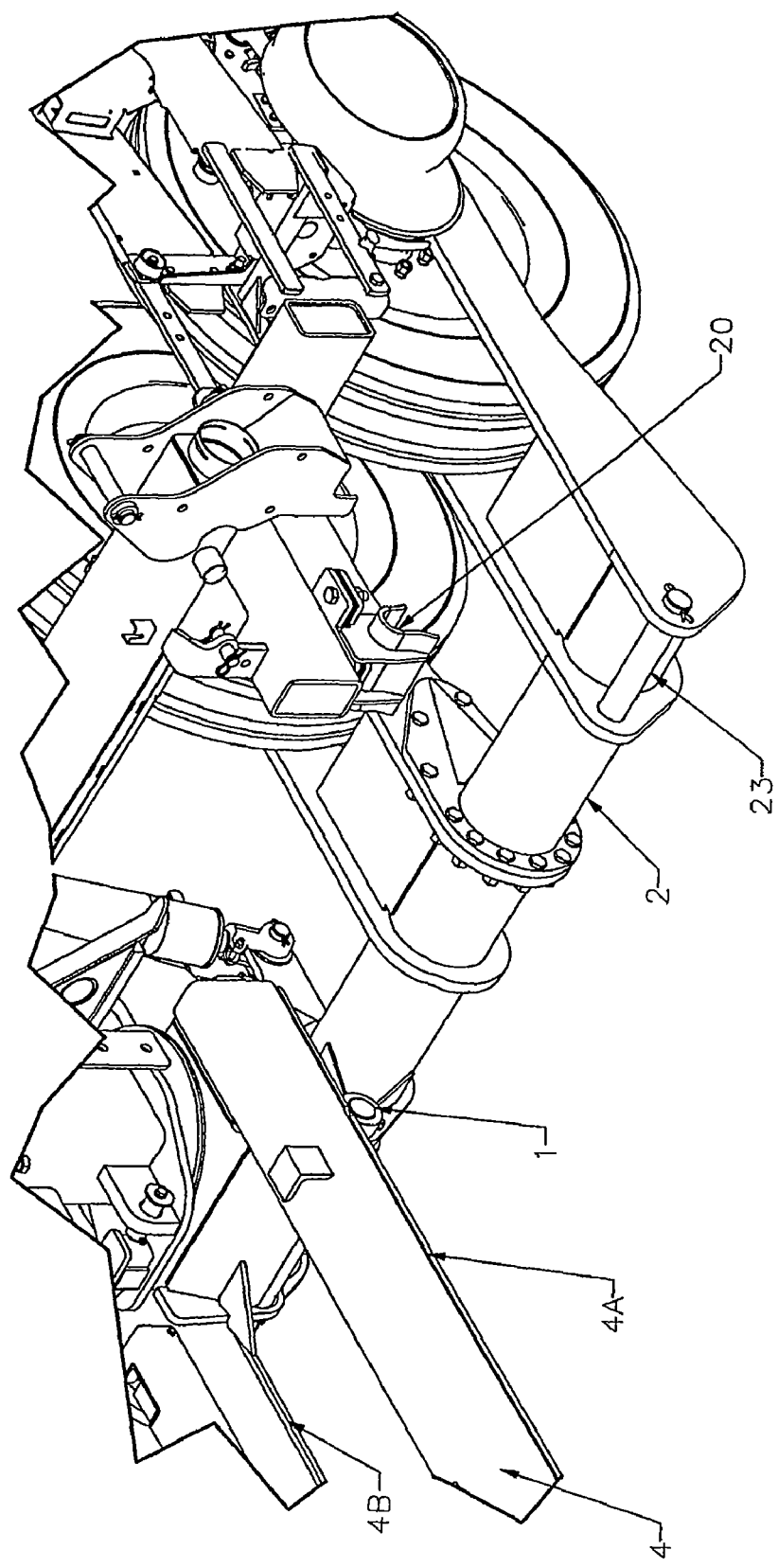
FIG. 2A is a perspective view illustrating details of the axle assembly and the hitch assembly.
Figure 8:
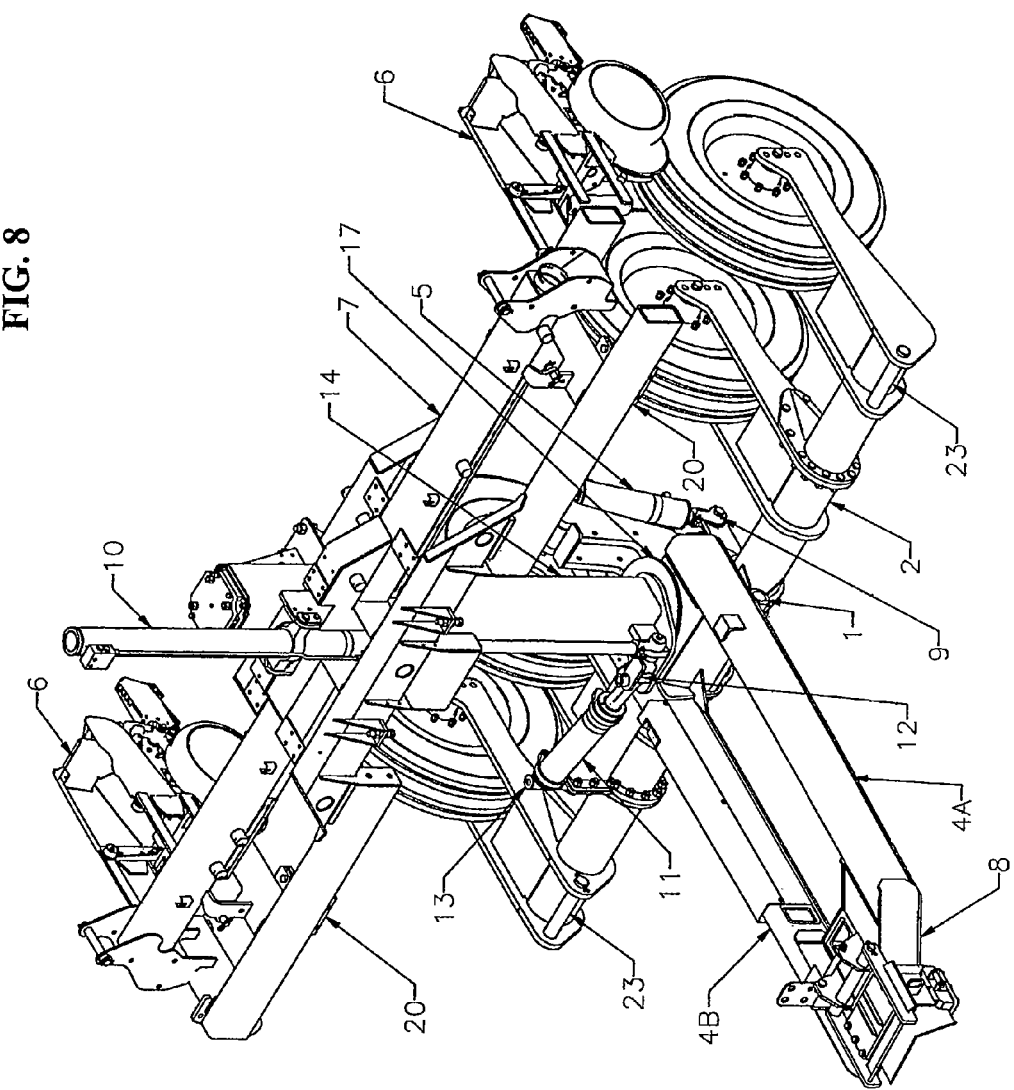
Figure 9:
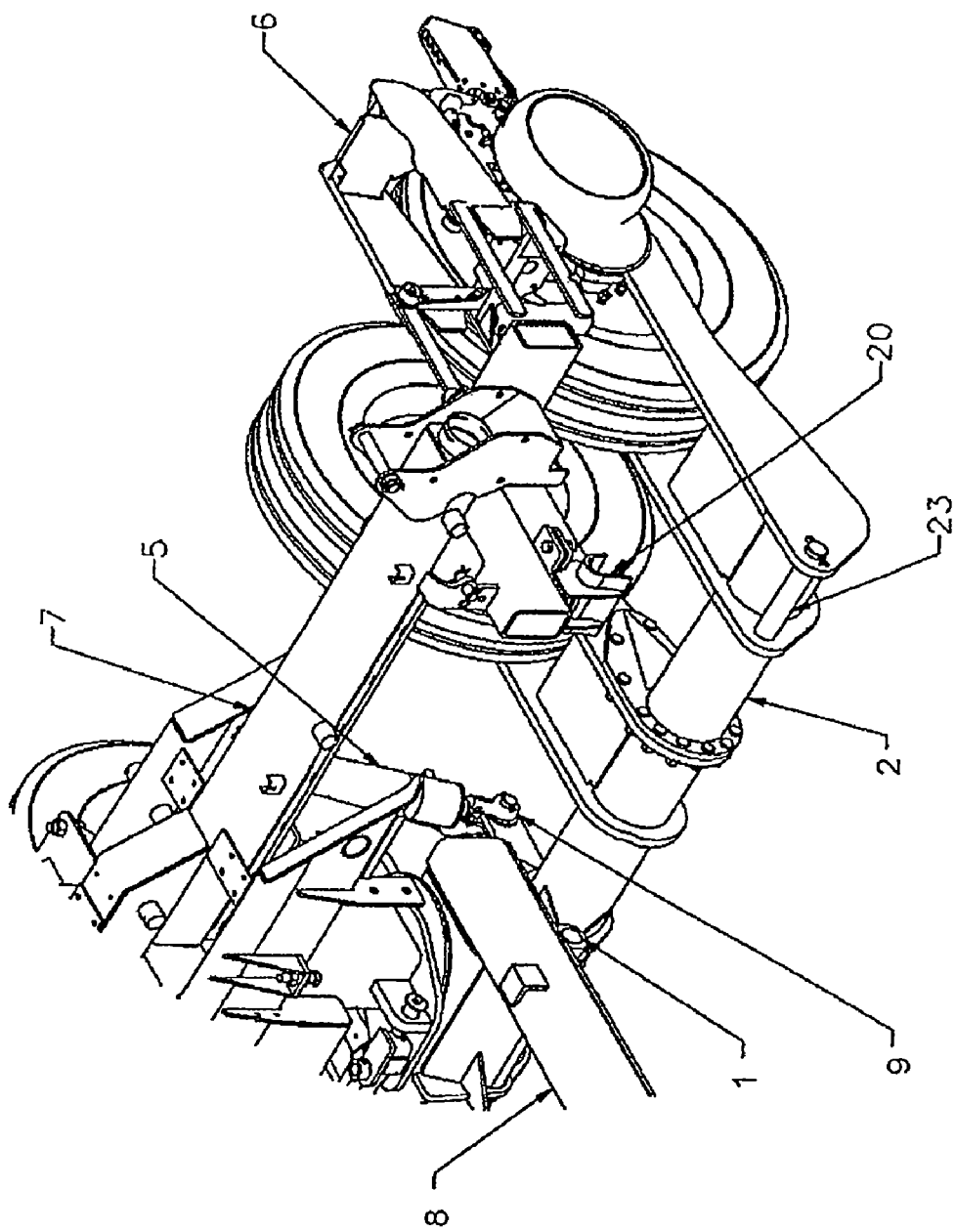
FIG. 9 is a perspective view of a portion of the inventive agricultural implement illustrating details of the positioning of the elevated lift frame relative to the axle assembly.

Turning first to FIG. 2, the telescoping hitch includes a long metal tube 3 which is adapted at its forward end with a tractor hitch 3A adapted to connect to a tractor, and a rear planter hitch section 4 which includes two laterally spaced metal tubes of square or rectangular cross section, designated 4A and 4B in FIG. 8, adapted to receive the forward tube 3 between them, in the telescoped (or transport) position (not shown). Referring now to FIGS. 2 and 2A, an axle assembly 2 is attached to the rear of the planter hitch 8 by means of a main pivot pin 1 extending transverse of the direction of travel and mounted rigidly to the underside of rear portion of the rear hitch section 4. Pivot pin 1 extends beneath, and is secured to both rear planter hitch members 4A and 4B.

Also attached at the rear of the hitch is a set of anchor points (i.e. heavy plates) 15 for the master lift cylinders 5. The master lift cylinders 5 have their cylinder ends pivotally connected to the axle 2, and their rod ends pivotally connected at 9 to an anchor plate 15 secured to the rear end of the hitch assembly 8 which react against the anchor plates 15 as they extend and rotate the main axle 2 clockwise in FIG. 1 about the pivot pin 1, i.e. down and forward, thereby raising the rear end of the hitch, and raising, the toolbar and row units to provide ground clearance for turning the planter around at the end of the field.

Figure 3:
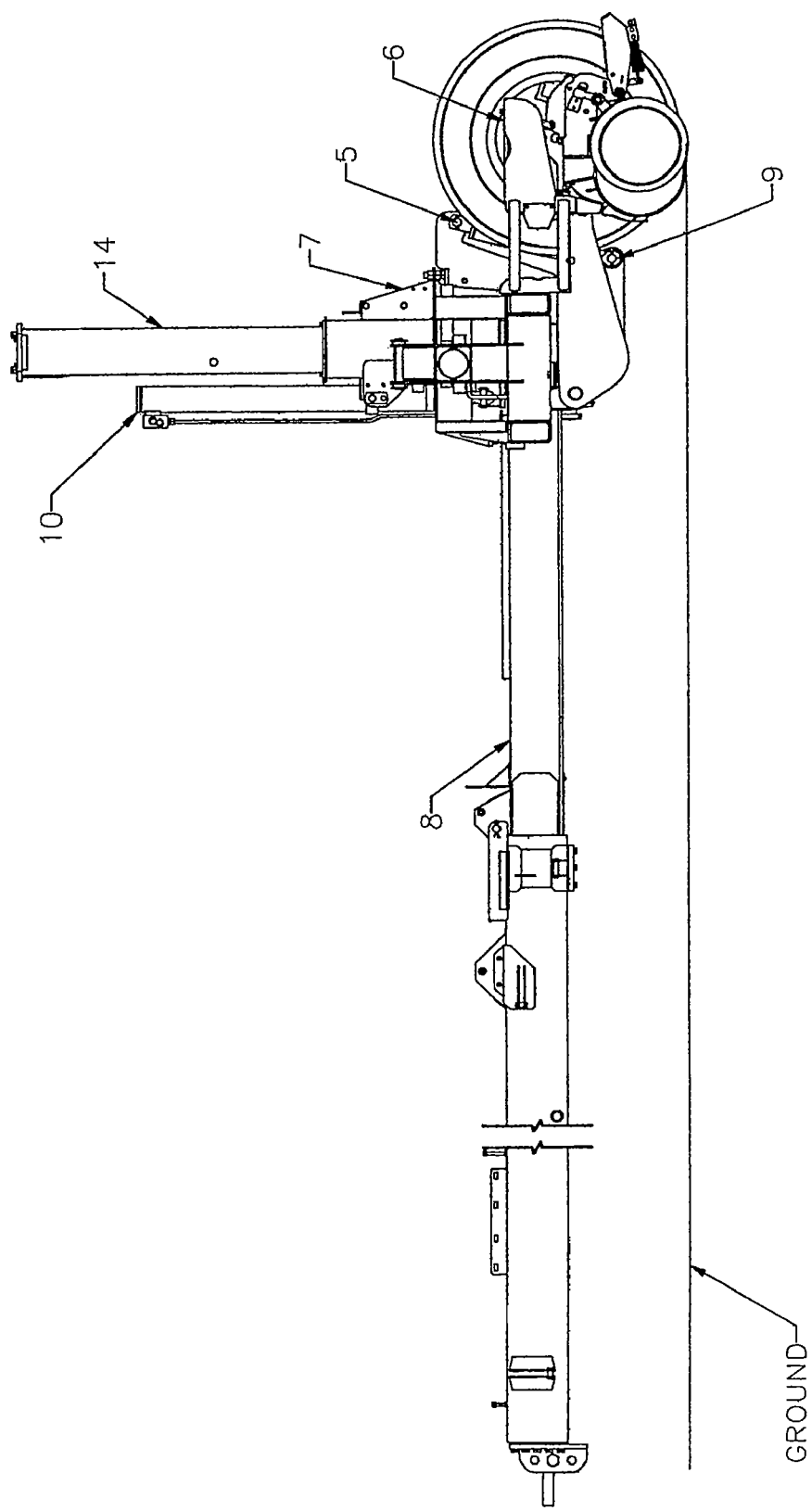
FIG. 3 is a partially cutaway side elevation view of a portion of the agricultural implement of the present invention in the use, or operating, configuration.
Figure 3A:
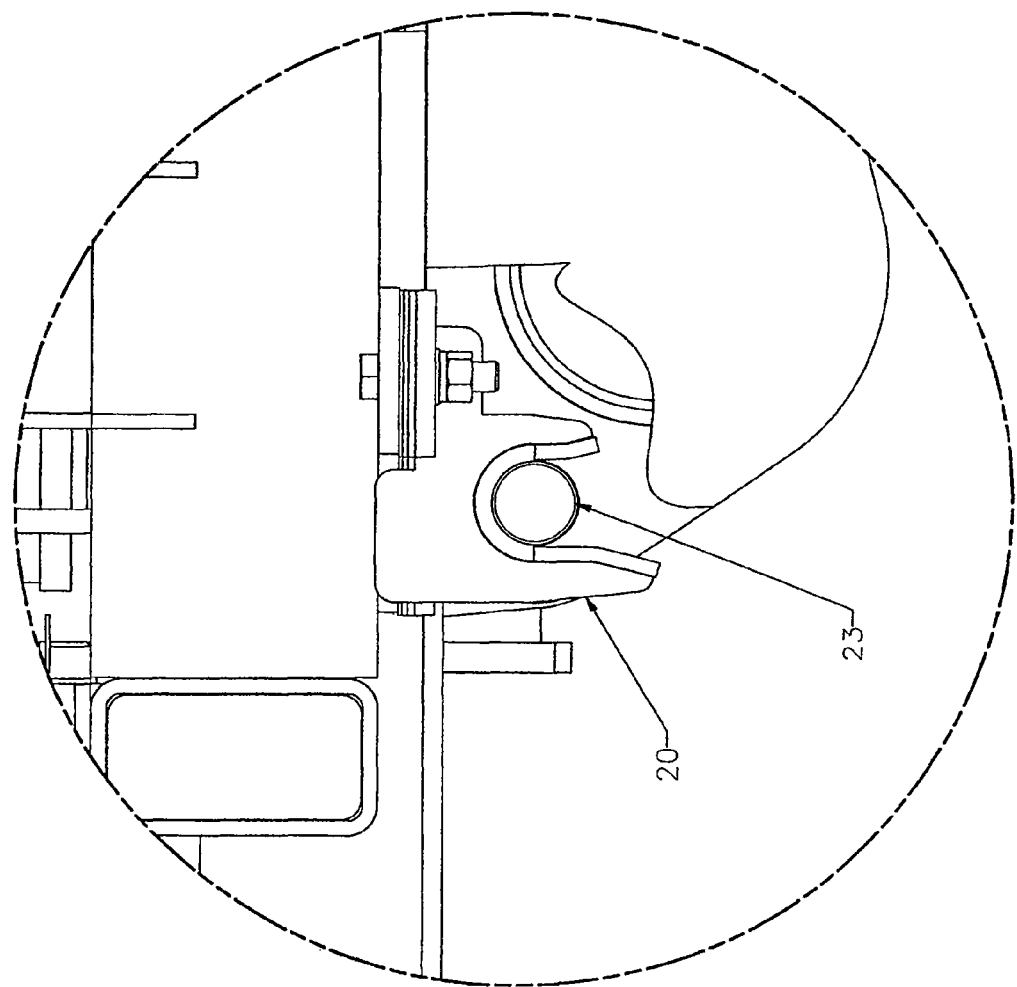
FIG. 3A is a side elevation view of a portion of the inventive agricultural implement in the use configuration illustrating details of the connection between the hitch assembly and the axle assembly.
Figure 4:
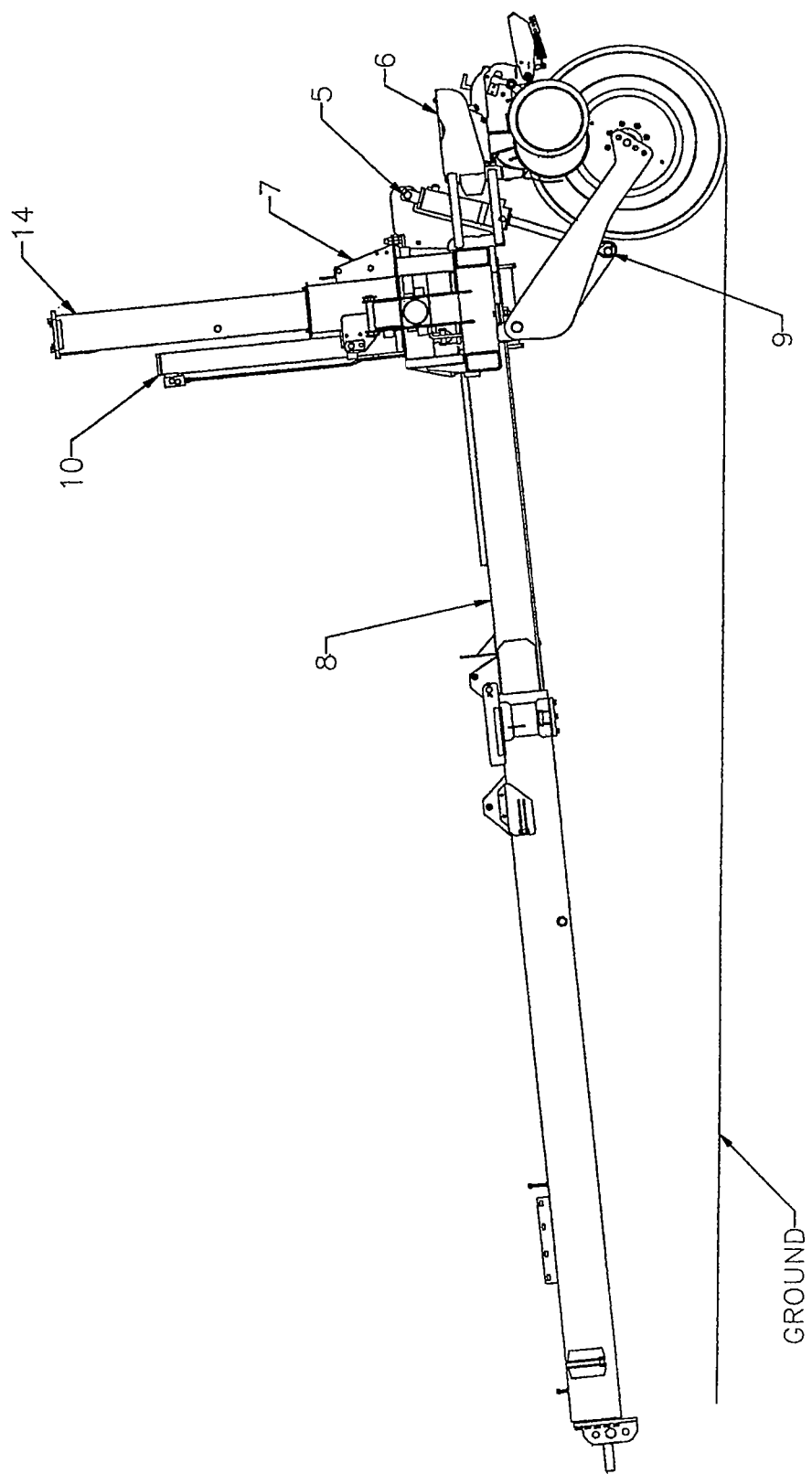
FIG. 4 is a side elevation view of the inventive agricultural implement in the second, higher elevated position configuration.
Figure 4A:
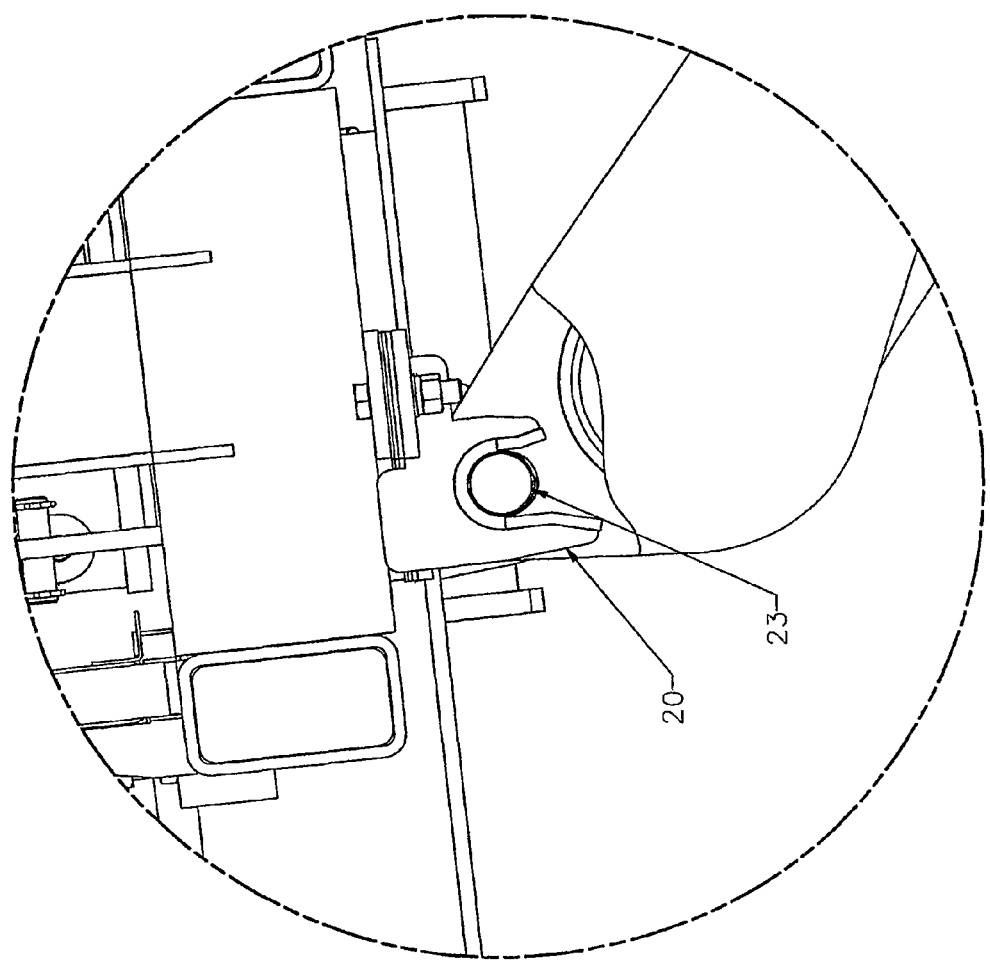
FIG. 4A is a side elevation view of a portion of the inventive agricultural implement illustrating additional details of the coupling between the hitch assembly and the axle assembly in the second, higher elevated position shown in FIG. 4.
Figure 5:
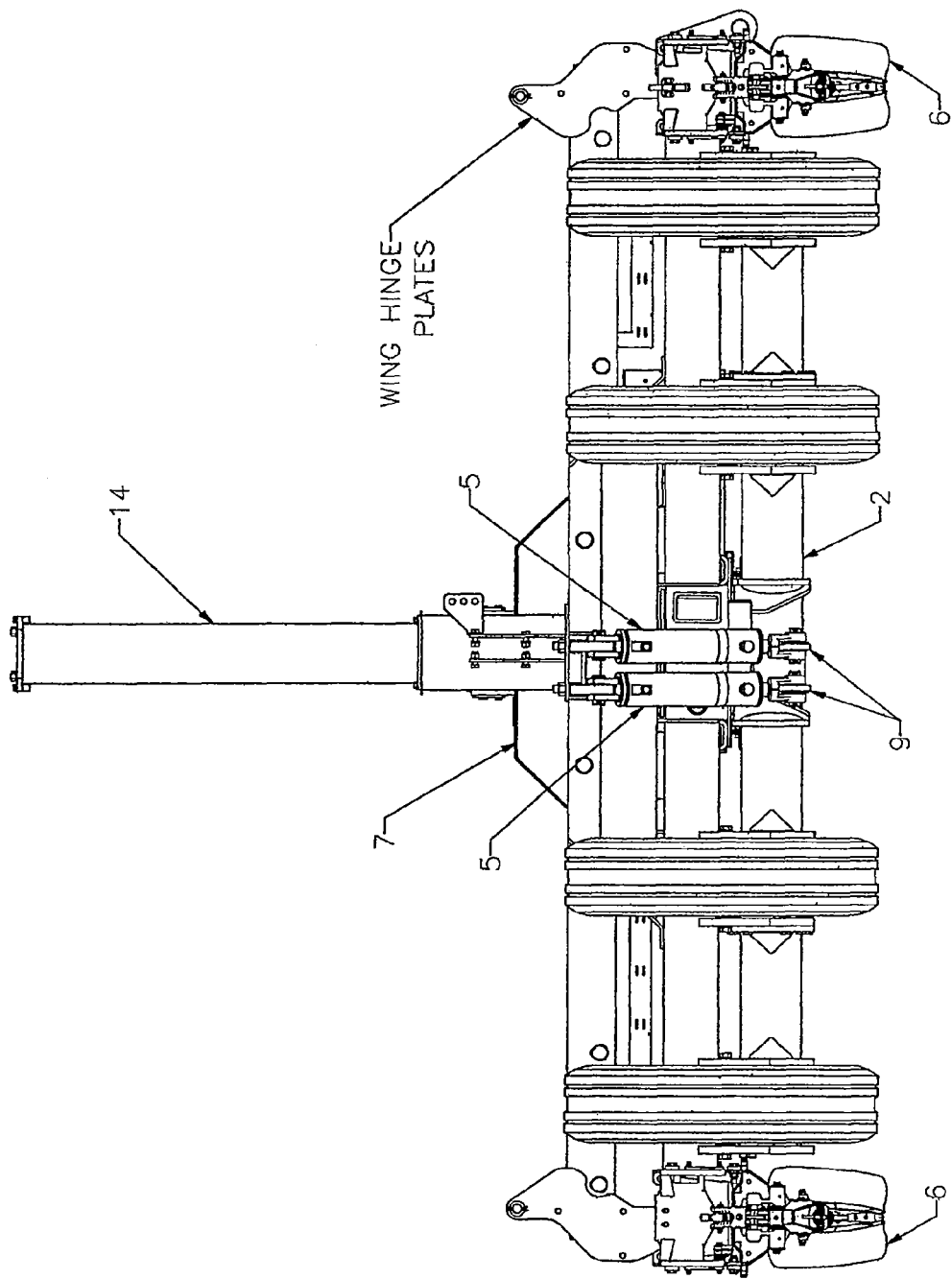
FIG. 5 is an aft elevation view of the inventive agricultural implement in the use, or operating, configuration.

When the planter is in the planting position, (see FIGS. 3-3A), the planter hitch 8 and the axle 2 are in a generally horizontal position with the row units (not shown) engaging the soil in the planting position. When it is necessary to raise the planter for field turn around at the end of a crop row, or to clear obstructions, the lift cylinders 5 connecting the planter hitch 8 to the axle 2 are extended, rotating the axle and wheel assembly about the axle pivot pin 1 (and bearings on the hitch)—thus elevating the hitch to raise the planter frame and row units to the position of FIG. 4. The result is added ground clearance beneath the rear of the planter hitch 8 and the row units 6.

Referring to FIG. 8, a sleeve containing bearings and including a mounting plate 17 is fixed to the rear of rear section 4 of the planter hitch 8 to mount and support a vertical tubular post 14 for rotation about a vertical axis. An arm 12 is connected to the lower portion of the vertical post 14 above the planter hitch 8. Arm 12 is in turn connected to one end of a hydraulic cylinder 11, the other end of which is connected to a stationary anchor point 13 located on a horizontally extending arm 16, which is rigidly connected to the planter hitch 8.

When extended, the cylinder 11 rotates the vertical post 14 (counterclockwise when viewed from above) through a quarter turn. Mounted to the vertical lift post 14 is the center section of the toolbar, or, as it is sometimes referred to, the lift frame, generally designated 7, of the planter toolbar. The two side sections of the toolbar are not shown, for simplicity.

Figure 6:
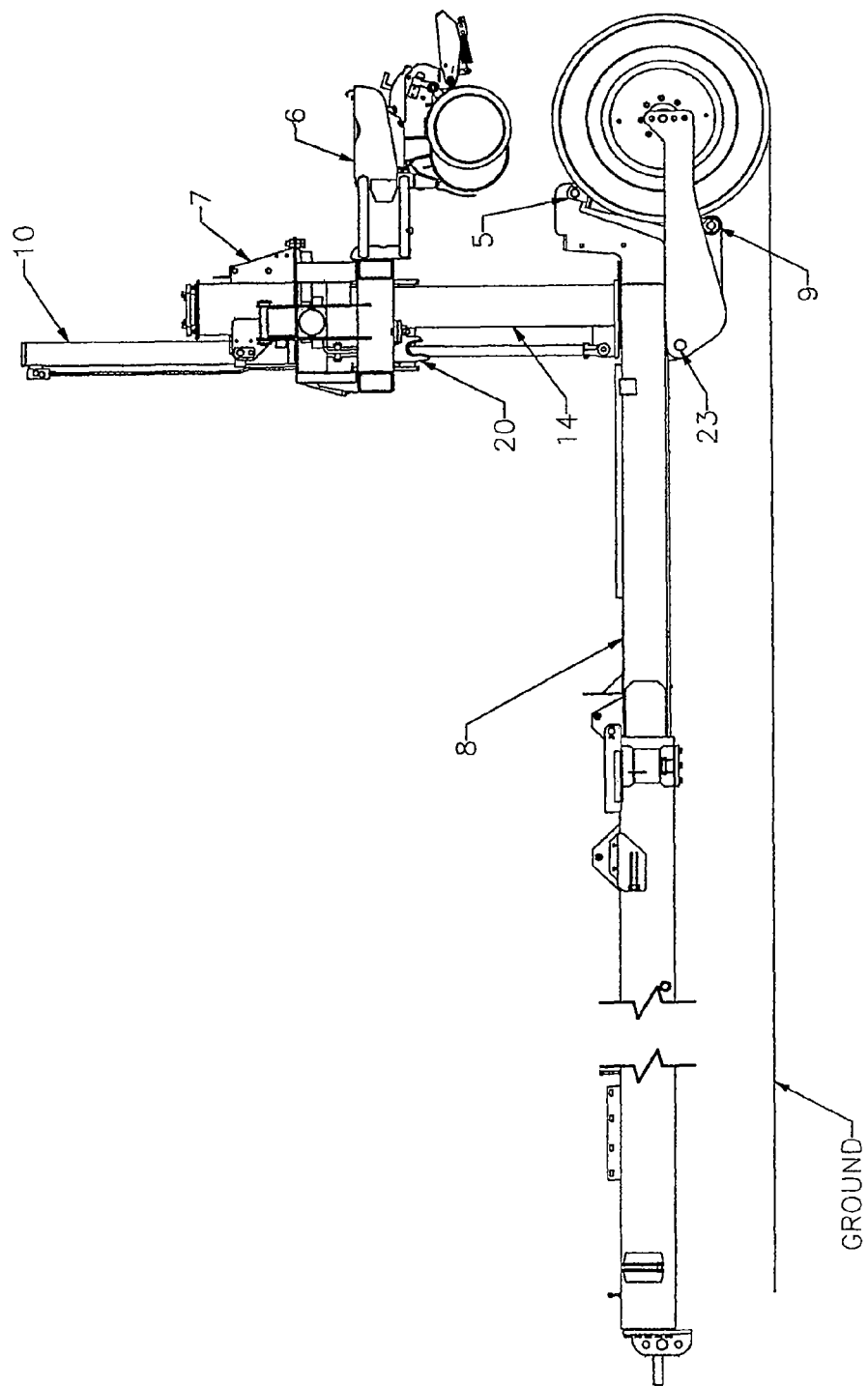
FIGS. 6, 7 and 8 are respectively side elevation, rear planar and perspective views of the inventive agricultural implement illustrating the lift frame in an elevated position prior to rotation of the lift frame for transport.
Figure 7:
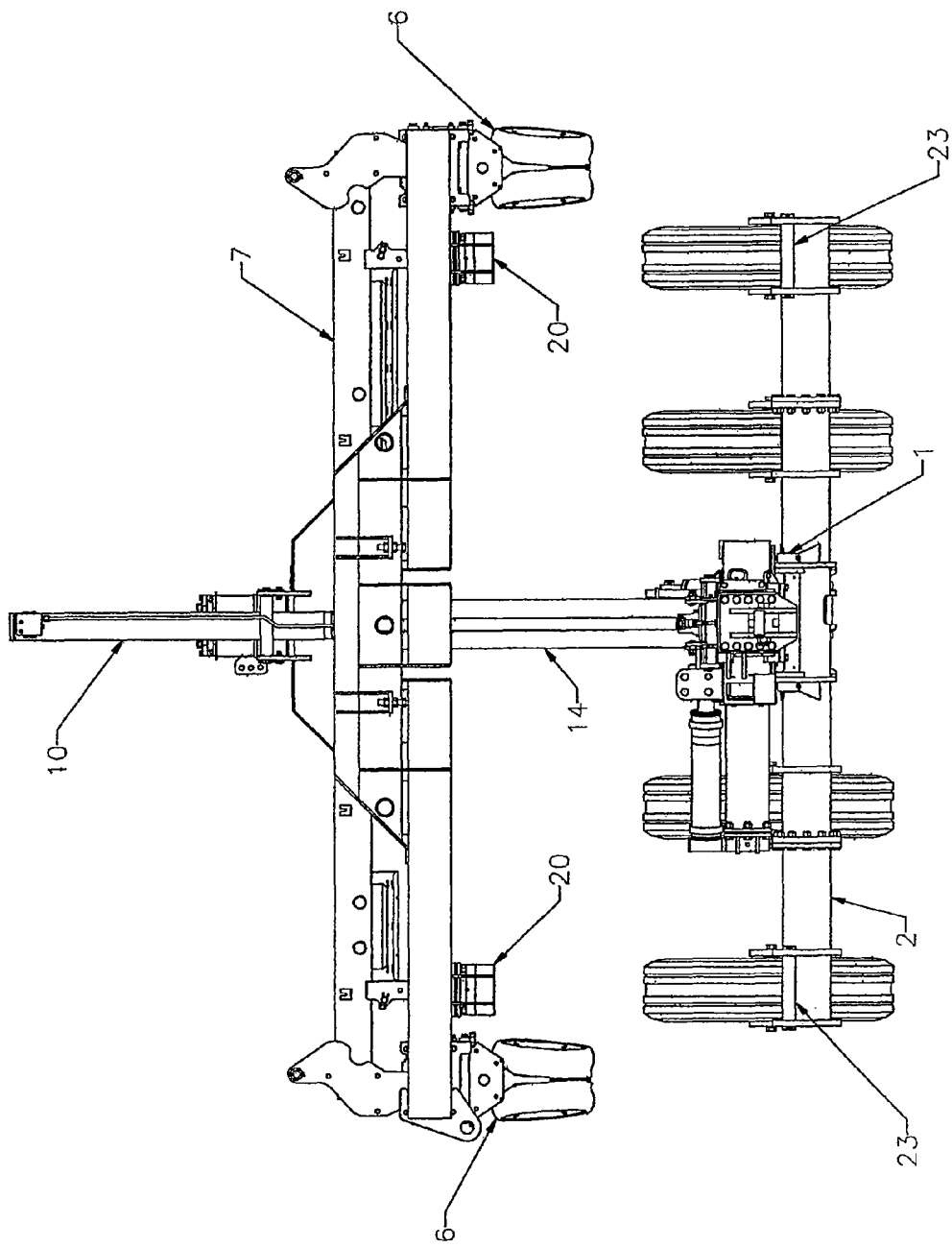

A hydraulic cylinder 10 (see FIGS. 6-8) is mounted between the vertical lift post 14 and the center section 7 of the lift frame of the planter toolbar to elevate the planter toolbar when it is desired to move the planter to the transport position. It will be observed that the transport elevation function (independent cylinder 10) is separate and unique from the field-turn elevation function (master lift cylinders 5). This is significant at least for the reason that the support wheels on the outboard ends of the toolbar are in a separate hydraulic circuit from the transport lift cylinder. With this arrangement, the outboard lift wheels can be locked in the retracted (raised) position before the toolbar is raised to the transport elevations so that when the raised toolbar is turned for transport by cylinder 11, the lowest point of the outboard wheels is much higher than a prior design, to provide greater clearance in rotating to transport and during transport.

When viewed from above, and in the direction of travel, the axle/hitch configuration is generally that of an inverted "T" shape with the axle wheels located along the bar of the "T" and spaced equally apart, with the set being centered on the center of the hitch. The axle wheels are placed in a manner that allows them to run between the planter row units and their location is determined by the row spacing that the planter is built to accommodate. In the described embodiment there are four center axle tires generally located on 30" centers, sometimes referred to as the "center set of axle wheels." This arrangement places the outer pair of axle wheel centers generally located 120" apart. These locations may vary with different row crop spacings. The planter is designed to rotate about the center post to move from a transport to a field use position. It is necessary to stabilize the toolbar against the hitch/axle structure while the planter is in the field use position. Previous methods have used a cam and track configuration, with drawbacks previously discussed.

The instant invention uses a pair of downward facing semi-circular shaped socket/bearings 20 fixed to the planter lift frame, one being seen in FIG. 2A and designated 20. Cross pins 23 are mounted to the wheel support arms located near the outer ends of the axle structure to engage the stabilizer socket/bearings 20 as the planter is lowered to the field use position by the transport cylinders.

Figure 1:
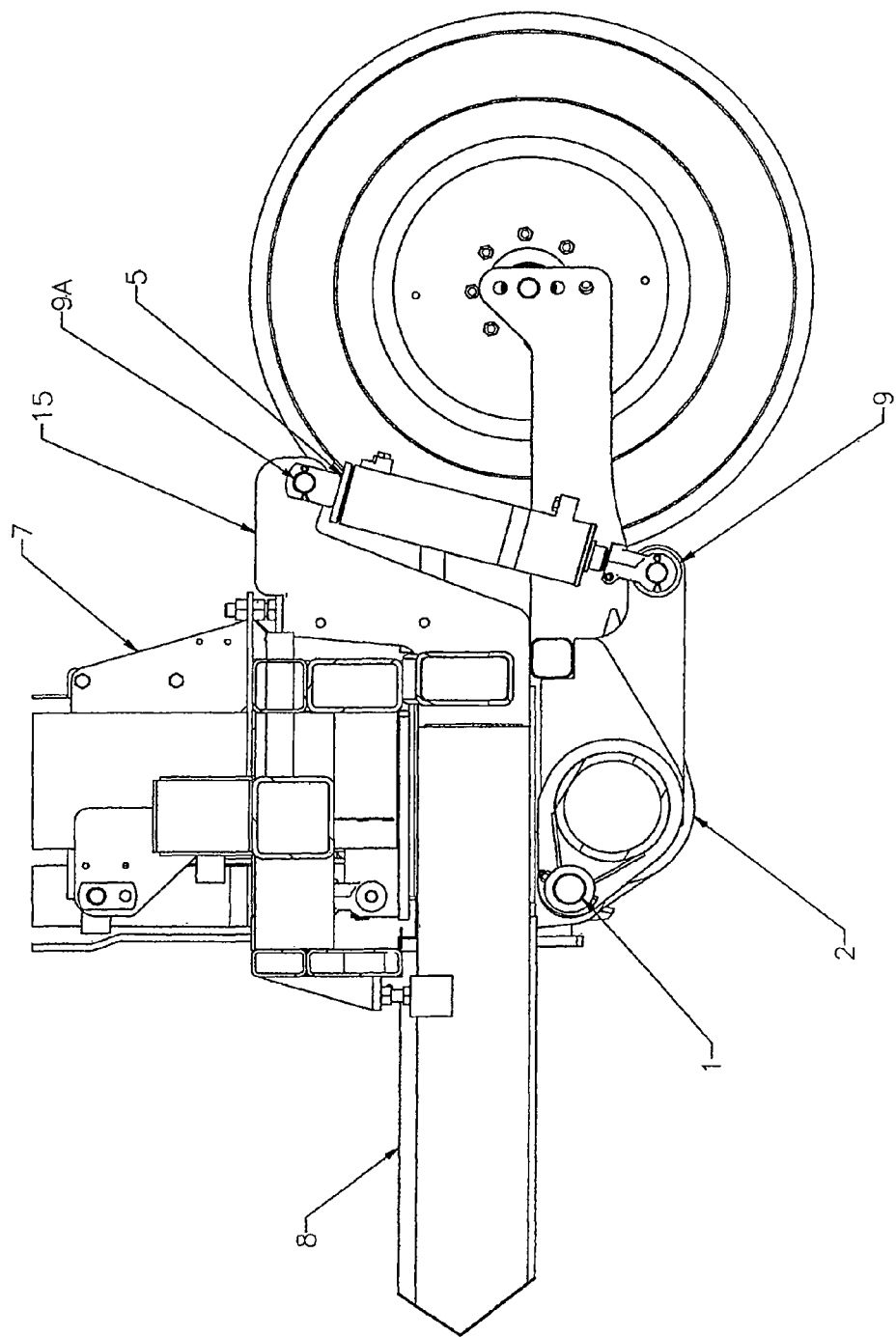
FIG. 1 is a side elevation view of an agricultural implement in accordance with the principles of the present invention showing the implement's lift frame in the use position.
Figure 1A:
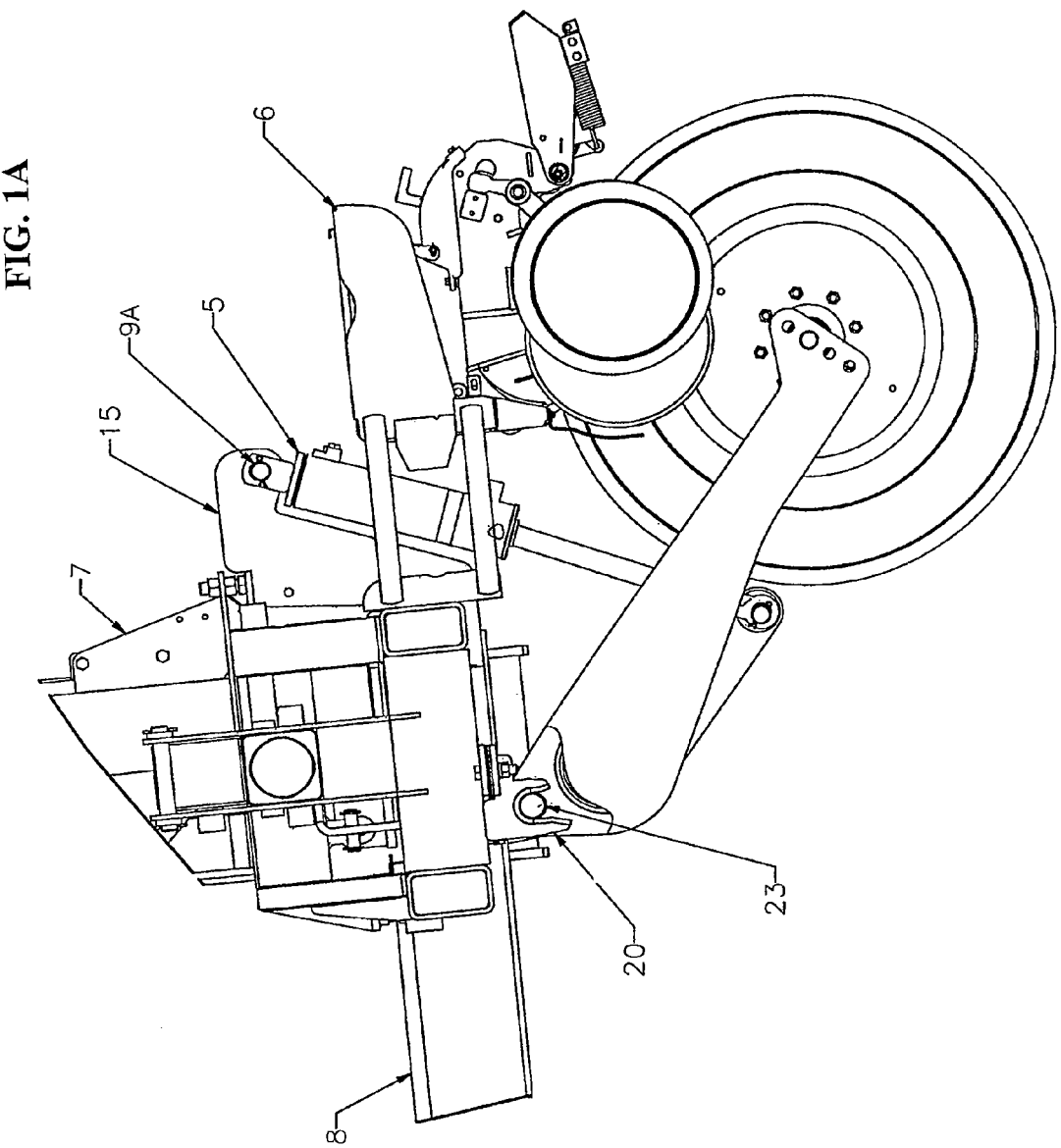
FIG. 1A is a side elevation view of the agricultural implement shown in FIG. 1 illustrating its lift frame in a first elevated position.
Figure 1B:
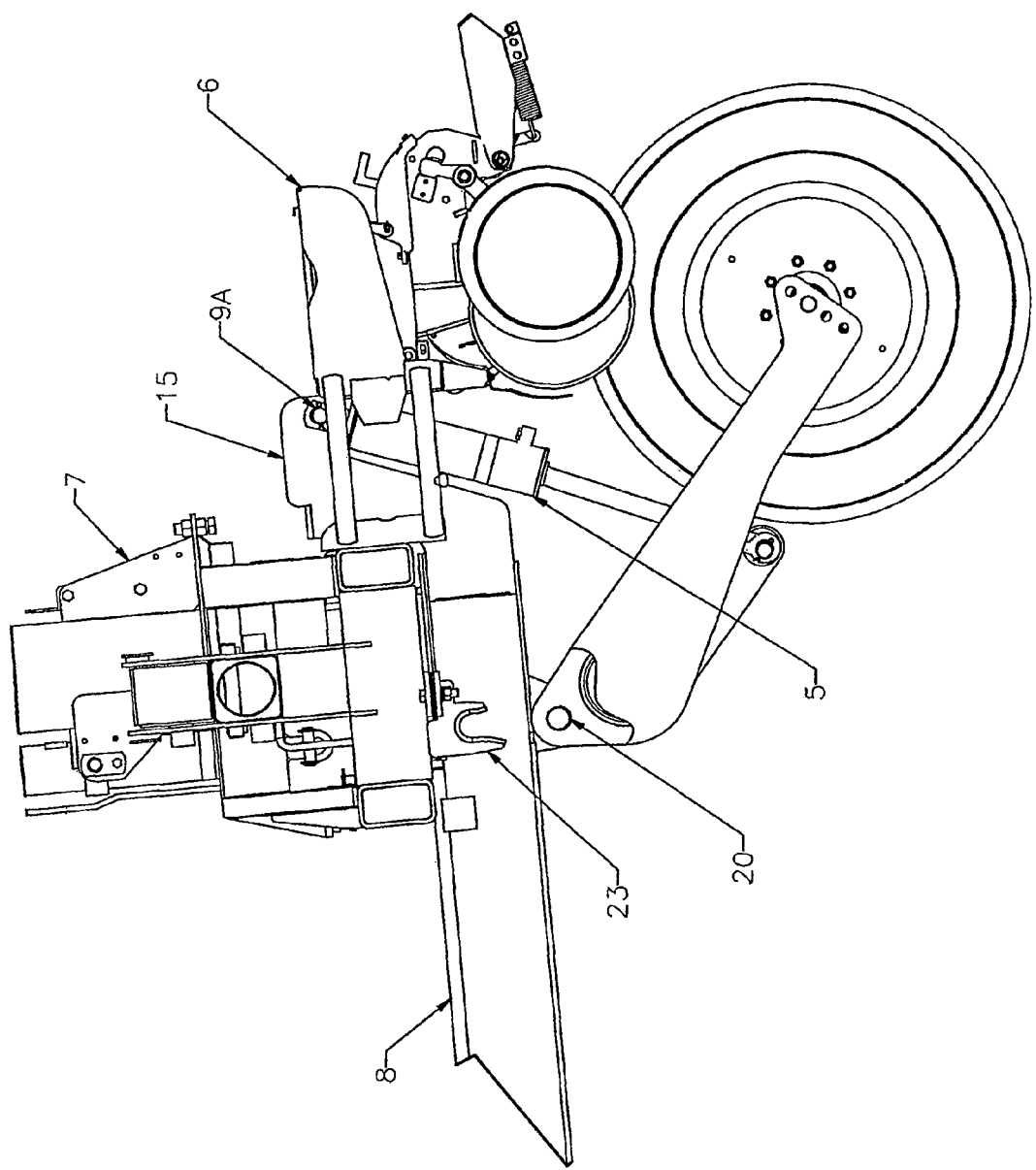
FIG. 1B is a side elevation view of the inventive agricultural implement showing its lift frame in a second, higher elevated position.

The axes of the cross pins 23 are located on the axis of rotation of the wheel arms—that is, the axis of the main axle pivot pin 1, FIG. 1, which pivotally couples the axle 2 to the planter hitch 8.

The cross pins 23 are placed laterally as far as practical over the width of the axle to provide maximum lateral stability.

This combination of stabilizer bearing/socket and collinear pins mounted to the axle assembly spaced equally from the center and as far to the side as practicable, act as outriggers when the center section 7 (and the entire toolbar frame and row units) is lowered to the planting position.

When operator activates the axle lift (master) cylinders 5 to raise the planter to the field turn around position, the cross pins 23 remain engaged in the socket/bearings 20 and maintain constant engagement over the entire lift cycle and effectively act as a pin connected joint providing both the rotational stability and structural integrity mentioned above to the axle/frame combination.

When the planter toolbar is raised by actuation of the transport cylinder 10 toward the transport position, but prior to elevating to the transport height seen in FIG. 8, the stabilizer/bearing sockets disengage so that when the toolbar is raised to the transport height, it may be rotated to the longitudinal transport position. This raising is accomplished by an independent hydraulic circuit so that the end wheels on the toolbar may be maintained in the raised position during elevation and rotation of the toolbar and row units.

The downwardly opening stabilizer socket/bearings 20 couple to cross pins 23 and brace the toolbar against movement about a vertical axis. That is, the wheels are secured in a forward direction; and prevented from deviating in yaw. Moreover, the strength and weight of the center frame couples directly to the wheel axle by means of these stabilizer socket/bearing structures, thereby providing additional strength to the center section frame (the outrigger effect discussed above), while permitting reliable and easy uncoupling of the releasable stabilizers when it is desired to raise the toolbar to transport height.

The above described design provides the advantage of added clearance and structural integrity when needed during field operations along with simplified hydraulic circuits that separate the field operating circuits and cylinders from those of the transport circuits without compromising the structural strength of the use configuration and providing greater clearance for the end wheels in rotating the toolbar to the transport position, and road travel.

The invention claimed is:

1. An agricultural implement adapted to be pulled by a traction vehicle having a hitch and convertible between a use configuration and a transport configuration, said agricultural implement comprising:

a carrier frame aligned generally transverse to the direction of travel of said agricultural implement, said carrier frame having an axle with plural ground engaging wheels:

draft tongue means adapted for pivotal coupling at a forward portion thereof to the traction vehicle's hitch and further pivotally coupled at an aft portion thereof to said carrier frame, said draft tongue means having an upwardly extending vertically cornered post attached to an aft portion thereof, wherein said post is rotatable about a vertical pivot axis;

a lift frame adapted for coupling to plural row units attached to said lift frame along the length thereof in a spaced manner, wherein said lift frame includes an integral center frame section extending generally transverse to the direction of travel of said agricultural implement in a lowered use position, and wherein said lift frame further includes a sleeve adapted for sliding engagement with said post for allowing movement of said lift frame on and along the length of said post;

first displacement means coupling the aft portion of said draft tongue means to said carrier frame for pivotally moving the aft portion of said draft tongue means and said lift frame between said use position and a first elevated position for avoiding obstructions and to facilitate turning in a field;

second displacement means coupling said lift frame to a lower portion of said post for moving said lift frame substantially vertically along said post between said first elevated position and a second higher elevated position; and third displacement means coupling said post to said carrier frame for rotating said post and said lift frame about said vertical pivot axis to a longitudinal position for transport.

2. The agricultural implement of claim 1 further comprising a first pivot pin arrangement coupling an aft portion of said draft tongue means to said carrier frame, wherein said first pivot pin is aligned generally transverse to the direction of travel of the agricultural implement.

3. The agricultural implement of claim 2 wherein said first pivot pin arrangement is pivotally coupled to said axle.

4. The agricultural arrangement of claim 3 wherein said first displacement means includes first and second hydraulic cylinders pivotally coupled to an aft portion of said draft tongue means and to an inner portion of said axle.

5. The agricultural implement of claim 4 wherein said first and second hydraulic cylinders are positioned generally perpendicular to said draft tongue means and generally vertical, lying in planes parallel to the longitudinal axis of the agricultural implement.

6. The agricultural implement of claim 4 wherein said axle is pivotally displaced about its longitudinal axis in response to actuation of said first and second hydraulic cylinders between a first position wherein said lift frame is in said use position and a second position wherein said lift frame is in said first elevated position.

7. The agricultural implement of claim 1 further comprising first and second couplers pivotally connecting respective opposed ends of said lift frame to said carrier frame with said lift frame in the use position or first elevated position for stabilizing said lift frame relative to said draft tongue means and said carrier frame.

8. The agricultural implement of claim 7 wherein said first and second couplers allow for pivoting displacement between said lift frame and said carrier frame when said lift frame is moved between the use and first elevated positions, and wherein said first and second couplers detach the lift and carrier frames when said lift frame is raised to said second elevated position for transport.

9. The agricultural implement of claim 8 further including a first pivoting coupling connecting the aft portion of said draft tongue means to said carrier frame, and wherein said first and second couplers are linearly aligned with said first pivoting coupling in a direction generally transverse to the direction of travel of the agricultural implement.

10. The agricultural implement of claim 9 wherein each of said first pivoting coupling and said first and second couplers includes a respective pivot pin, and wherein the three pivot pins are in linear alignment in a direction generally transverse to the direction of travel of the agricultural implement.

11. The agricultural implement of claim 10 wherein each of said first and second couplers includes a respective pivot pin attached to a respective lateral portion of said carrier frame and a respective stabilizer/bearing member attached to a respective lateral portion of the lift frame's center frame section, wherein each stabilizer/bearing member is adapted to receive and engage an associated pivot pin in a releasable manner.

12. The agricultural implement of claim 11 wherein each stabilizer/bearing member is in the form of a downward facing semicircular shaped socket/bearing adapted to receive an associated pivot pin.

13. The agricultural implement of claim 1 wherein the carrier frame's ground engaging wheels are disposed intermediate adjacent row units when said lift frame is in the lowered use position.

14. The agricultural implement of claim 1 further comprising a mounting plate with bearings for attaching said post to an aft portion of said draft tongue means.

15. The agricultural implement of claim 1 wherein said draft tongue means includes an extendible member for increasing the length of said draft tongue means to accommodate the lift frame in the transport position.

16. The agricultural implement of claim 1 wherein said second displacement means comprises a hydraulic cylinder coupling said lift frame to a lower portion of said vertical post.

17. The agricultural implement of claim 1 wherein said third displacement means is a hydraulic cylinder coupling said carrier frame to said vertical post.

18. The agricultural implement of claim 17 wherein said hydraulic cylinder is connected at a first end to a stationary anchor point on said carrier frame and at a second opposed end to a lower end portion of said vertical post.

19. The agricultural implement of claim 1 wherein said draft tongue means and said vertical post are disposed on a longitudinal centerplane of the agricultural implement.

20. An agricultural implement adapted to be pulled by a traction vehicle having a hitch and convertible between a use configuration and a transport configuration, said agricultural implement comprising:

a carrier frame aligned generally transverse to the direction of travel of said agricultural implement, said carrier frame having an axle with plural ground engaging wheels;

draft tongue means having a forward portion adapted for pivotal coupling to the hitch and having an aft portion pivotally coupled to said carrier frame, said draft tongue means having an upwardly extending vertical cornered post attached to an aft portion thereof, wherein said post is rotatable about a vertical pivot axis;

a lift frame including an integral center frame section extending generally transverse to the direction of travel of the agricultural implement when in a lowered use position, said lift frame further including a sleeve disposed in a close-fitting manner about said post and allowing said lift frame to move along the length of said post in a sliding manner;

a first hydraulic system including first hydraulic displacement means for pivotally moving said lift frame between a use position and first elevated position for avoiding obstructions and to facilitate turning in a field; and a second hydraulic system including second and third hydraulic displacement means for respectively moving said lift frame between said first elevated position and a second higher elevated position and for rotating said post and said lift frame about said vertical axis to a longitudinal position for transport.

* * * * *